United States Patent
Allweil et al.

(10) Patent No.: US 10,802,952 B2
(45) Date of Patent: Oct. 13, 2020

(54) STREAMLINED CREATION OF INTEGRATION TESTS

(71) Applicant: PAYPAL, INC., San Jose, CA (US)

(72) Inventors: Eyal Allweil, Tel Aviv (IL); Lior Ebel, Modi'in (IL); Shir Fiszman, Givatayim (IL)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 16/235,592

(22) Filed: Dec. 28, 2018

(65) Prior Publication Data
US 2020/0210325 A1    Jul. 2, 2020

(51) Int. Cl.
*G06F 11/36* (2006.01)

(52) U.S. Cl.
CPC ...... *G06F 11/3684* (2013.01); *G06F 11/3664* (2013.01); *G06F 11/3688* (2013.01)

(58) Field of Classification Search
CPC ............. G06F 11/3664; G06F 11/3684; G06F 11/3688
USPC ........................................................ 717/133
See application file for complete search history.

(56) References Cited

U.S. PATENT DOCUMENTS

| | | | |
|---|---|---|---|
| 10,303,586 B1* | 5/2019 | Falko ................. | G06F 11/3636 |
| 2005/0204201 A1* | 9/2005 | Meenakshisundaram ................... | G06F 11/3664 |
| | | | 714/38.1 |
| 2015/0135158 A1* | 5/2015 | Tenev ................ | G06F 11/3684 |
| | | | 717/101 |
| 2015/0363296 A1* | 12/2015 | Lee ..................... | G06F 11/3688 |
| | | | 717/126 |
| 2018/0321918 A1* | 11/2018 | McClory ............ | H04L 41/5041 |

* cited by examiner

*Primary Examiner* — Ryan D. Coyer
(74) *Attorney, Agent, or Firm* — Haynes and Boone, LLP (57) ABSTRACT

Systems and methods for testing software programs during development are described that are provided in part by a software testing framework that can create unit tests for testing individual modules of code, and create corresponding integration tests for testing those code modules during later integration testing, without duplication of effort. The framework receives function calls, each corresponding to a unit test function. The framework generates unit test code based on the function calls, which is executed on a development device. Upon successful execution of the unit test code, the framework receives an indication to test the function calls in a test environment. The framework identifies dependencies of the function calls. The framework then generates integration test code corresponding to the function calls. The integration test code includes dependency resolution code for the evaluated dependencies. The generated integration test code is then deployed in a test environment.

20 Claims, 3 Drawing Sheets

STREAMLINED CREATION OF INTEGRATION TESTS

BACKGROUND

Field of the Disclosure

The present disclosure generally relates to computer software development, and more particularly, to development of integration tests for software.

Related Art

Development of software programs frequently includes testing of source code at multiple stages. For example, as a particular module of a software program is being written, developers may test that module during the development process. Once finalized in development, that module may also be tested as part of a larger software program to ensure expected behavior, for example, as part of a quality assurance process. However, these tests may be largely duplicative. Further, the quality assurance process tests performed when the module is incorporated into a larger software program may not test the same aspects of the module as tested during the development. As software becomes more a part of daily life, and rapid software development becomes higher priority, optimizing the testing process for code is important to ensure that the code operates properly and to speed the development and deployment of new software.

Thus, there is a need for improved testing of software programs.

BRIEF DESCRIPTION OF THE FIGURES

FIG. 3 is a schematic view illustrating an embodiment of a computing device; and Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for testing software programs during development. The systems and methods described herein are provided in part by a software testing framework that can create unit tests for testing individual modules of code and can also create corresponding integration tests for testing those code modules during later integration testing or quality assurance testing, without duplication of effort. In one embodiment, the software testing framework receives a plurality of function calls, each function call corresponding to a unit test function. The software testing framework generates unit test code based on the plurality of function calls. The generated unit test code is executed on a development device implemented on one or more computing devices. Upon successful execution of the generated unit test code, the software testing framework receives an indication to test the plurality of function calls in a test environment. The software testing framework identifies dependencies of the function calls, and at least one of the identified dependencies is based on the test environment in which the plurality of function calls will be tested. The software testing framework then generates integration test code corresponding to the plurality of function calls. The integration test code includes dependency resolution code for the evaluated dependencies. The generated integration test code is then deployed in a test environment.

As noted above, software development includes multiple phases of testing code modules. During the initial writing of a code module, developers may write and execute unit tests for the code module, which test the performance of the module or individual functions of the code module. For example, a code module may be written to accept user input in the form of a username and password to log the user in to a secure portion of a website. Unit tests may be written for individual functions of that code module, for example, to test that the username field does not accept certain input characters that could be used for malicious purposes, or to test that the password field masks a user's input into the field. Unit tests may also be written to ensure that multiple functions operate as expected; for example, upon entry of a proper username and password, the login button accepts that input and forms a proper request to a server to evaluate the login request. Unit tests may be performed, and corresponding code may be revised, until the unit test returns a successful result. In most cases, a successful result from a unit test is one that returns no errors.

Once unit tests confirm the expected operation of the code module, that code module may be incorporated into a larger piece of software. For example, the login module detailed above may be incorporated into a web application that allows a user to log in to his or her account and view an account balance with a payment provider, such as PAY-PAL® of San Jose, Calif. To test that the login module operates as expected when incorporated into the web application, which includes other code modules, integration tests may be written. An integration test may use a sample account, with a sample username and password, and test that the login module accepts the username and password. This may be accomplished by sending the information to an authentication server, and upon a positive authentication result from the server, allowing the sample account user to view an account balance. Thus, the integration test may have some dependencies. For example, the integration test may require that the sample account with the sample username and password exist, and that the sample account corresponds to data in a testing database that would authenticate the sample account and return data to cause the display of the sample account's balance.

Different teams within a business may be responsible for the unit test and integration test processes detailed above. For example, software developers may perform unit testing, while quality assurance personnel may perform integration testing. To ensure that the software, when deployed for production, operates as expected, the developers and quality assurance teams must work closely to ensure that all aspects of the module are accurately tested at both testing phases. At times, this may include significant duplication of effort; for example, unit tests and integration tests may not share significant aspects, the frameworks used to perform unit tests may be different than those used to perform integration tests, and/or errors may occur when taking a previously-written unit test and performing a corresponding unit test.

Thus, to provide for technical accuracy and assurance that integration tests and unit tests properly validate the operation of a software module, a software testing framework described herein generates unit tests and corresponding integration tests with satisfied dependencies and without duplicating effort between the creation of both types of tests. Further, upon a successful (i.e., error-free) execution of the unit test code, the software testing framework may generate the integration test code and deploy the integration test code in a test environment to evaluate whether the modules operate as expected. If the deployment in a test environment is successful, the software testing framework may generate further integration test code for a different, more complex test environment that closely emulates a production environment, again without duplication of software development effort. The complex test environment may include a greater number of computing devices (e.g., web servers, database servers, etc.) that more closely approximates a production environment, and may require different integration test code to deal with such variations.

Figure 1:
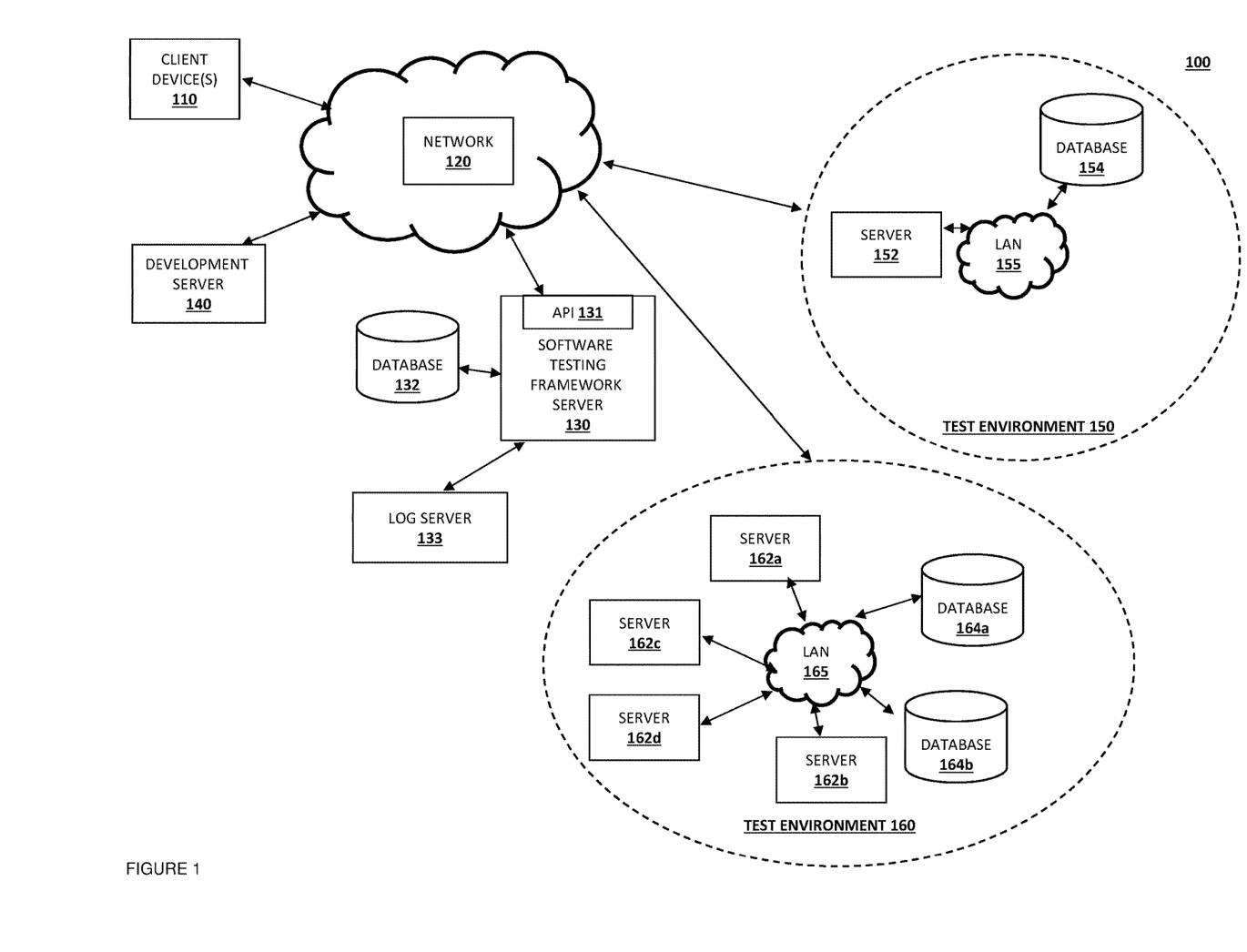
FIG. 1 is a schematic view illustrating an embodiment of a networked software development system.

Referring now to FIG. 1, an embodiment of a networked system 100 is illustrated. The networked system 100 may be a software development system. The networked system 100 includes one or more client devices 110 that are coupled to a network 120. A software testing framework server 130 is coupled to the network 120. Coupled to software testing framework server 130 may be a database 132 and a log server 133. Software testing framework 130 may also expose an application programming interface 131, which may provide for other devices to access the functionality of software testing framework server 130.

Also coupled to network 120 are multiple other devices. For example, development server 140 may be connected to network 120. Development server 140 may be implemented by a computing device and used to develop software applications by users who may utilize client devices 110. Thus, development server 140, in some embodiments, may be a terminal server, or may provide a more robust computing environment for software development than provided by client device 110.

Also coupled to network 120 are test environments 150 and 160. Test environment 150 may include server 152 and database 154, coupled to a local area network 155. It should be understood that database 154 may be implemented, in one embodiment, by a database server coupled to storage devices (e.g., solid state drives or spinning platter drives). In one embodiment, the server 152 is a virtual machine host server or hypervisor, such as an OpenStack server configured to host OpenStack virtual machines. In one embodiment, test environment 150 is used for integration testing of software applications. In one embodiment, test environment 150 is part of a first data center connected to network 120.

Test environment 160 may include a number of servers 162a-162d and databases 164a-164b, coupled to a local area network 165. Like database 154, databases 164a-164b may be implemented by a database server coupled to one or more storage devices. In one embodiment, servers 162a-162d are part of a load balancing arrangement. For example, servers 162a-162d may provide the same or similar functionality, and a load balancer may direct requests received from network 120 to one or more of the servers 162a-162d, depending on the load of each server. For example, load balancing arrangements may be used for web servers.

Databases 164a-164b may also be part of a load balancing arrangement for database services. Additionally, databases 164a-164b may be part of a sharding arrangement. In a sharding arrangement, a data set may be partitioned and stored on two or more databases, which may improve the performance of the database.

In one embodiment, test environment 150 and test environment 160 are configured to emulate a production environment in which a developed software application is eventually deployed. Because developed software applications should be tested in environments that are identical to, or closely emulate, a production environment, test environment 160 may emulate a production environment that uses load balancing and sharding to quickly respond to user requests received from client devices 110 over network 120.

In the embodiments discussed below, the networked system 100 may be used by a payment service provider or other entity to develop and test software applications, such as one or more payment service provider applications, including checkout application, money sending application, and/or other payment service provider applications. Other applications may include back-end or back-office type applications, such as web server software, mobile-device applications, and other applications. As such, the software applications may be developed on client devices 110 or development server 140. Software testing framework server 130 may generate unit tests for the software under development and cause performance of those unit tests (e.g., on a client device 110 or development server 140). Upon a successful unit test, the software testing framework server 130 may generate integration tests and cause performance of those integration tests on a test environment, for example, test environment 150. In some embodiments, the software testing framework server 130 may also generate integration tests and cause performance of those integration tests on a different test environment, such as test environment 160. One of skill in the art in possession of the present disclosure will recognize that the systems and methods of the present disclosure will be beneficial to a wide variety of applications provided by a wide variety of different system providers. As such, while specific references are made to a payment service provider providing the systems and methods of the present disclosure, any service provider utilizing the teachings of the present disclosure to deploy development environments is envisioned as falling within the scope of the present disclosure.

The client devices 110, software testing framework server 130, development server 140, servers 152, 162a-162d, log server 133, databases 132, 152, and 164a-b may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 100, and/or accessible over the network 120.

The client devices 110 may be implemented using any appropriate combination of hardware and/or software configured for wired and/or wireless communication over network 120. For example, in one embodiment, the client devices 110 may be implemented as a personal computer of a user in communication with the Internet. In other embodiments, the client devices 110 may be a smart phone, laptop computer, wearable computing device, and/or other types of computing devices.

The client devices 110 may include one or more browser applications which may be used, for example, to provide a convenient interface to permit users to browse information available over the network 120. For example, in one embodiment, the browser application may be implemented as a web browser configured to view information available over the Internet.

The client devices 110 may also include one or more toolbar applications which may be used, for example, to provide user-side processing for performing desired tasks in response to operations selected by the user. In one embodiment, the toolbar application may display a user interface in connection with the browser application.

The client devices 110 may further include other applications as may be desired in particular embodiments to provide desired features to the client devices 110. The other applications may also include security applications for implementing user-side security features, programmatic user applications for interfacing with appropriate application programming interfaces (APIs) over the network 120, or other types of applications. Email and/or text applications may also be included, which allow the user to send and receive emails and/or text messages through the network 120. The client device 110 include one or more user and/or device identifiers which may be implemented, for example, as operating system registry entries, cookies associated with the browser application, identifiers associated with hardware of the client device 110, or other appropriate identifiers, such as a phone number.

The network 120 may be implemented as a single network or a combination of multiple networks. For example, in various embodiments, the network 120 may include the Internet and/or one or more intranets, landline networks, local area networks, wide area networks, wireless networks, and/or other appropriate types of networks.

The software testing framework server 130 may be coupled to a database 132. In some embodiments, as described further herein, the database 132 stores templates or other instructions to generate unit test code and corresponding integration test code which can be used by software testing framework server 130 to generate test code.

Software testing framework server 130 may also be coupled to a log server 133. In one embodiment, as shown, software testing framework server 130 is coupled directly to log server 133. In some embodiments, software testing framework server 130 may be coupled to log server 133 using network 120, or log server 133 may be part of software testing framework server 130. Log server 133 may log various events for software testing framework server 130, such as successful unit test code execution or successful integration test code execution.

Figure 2:
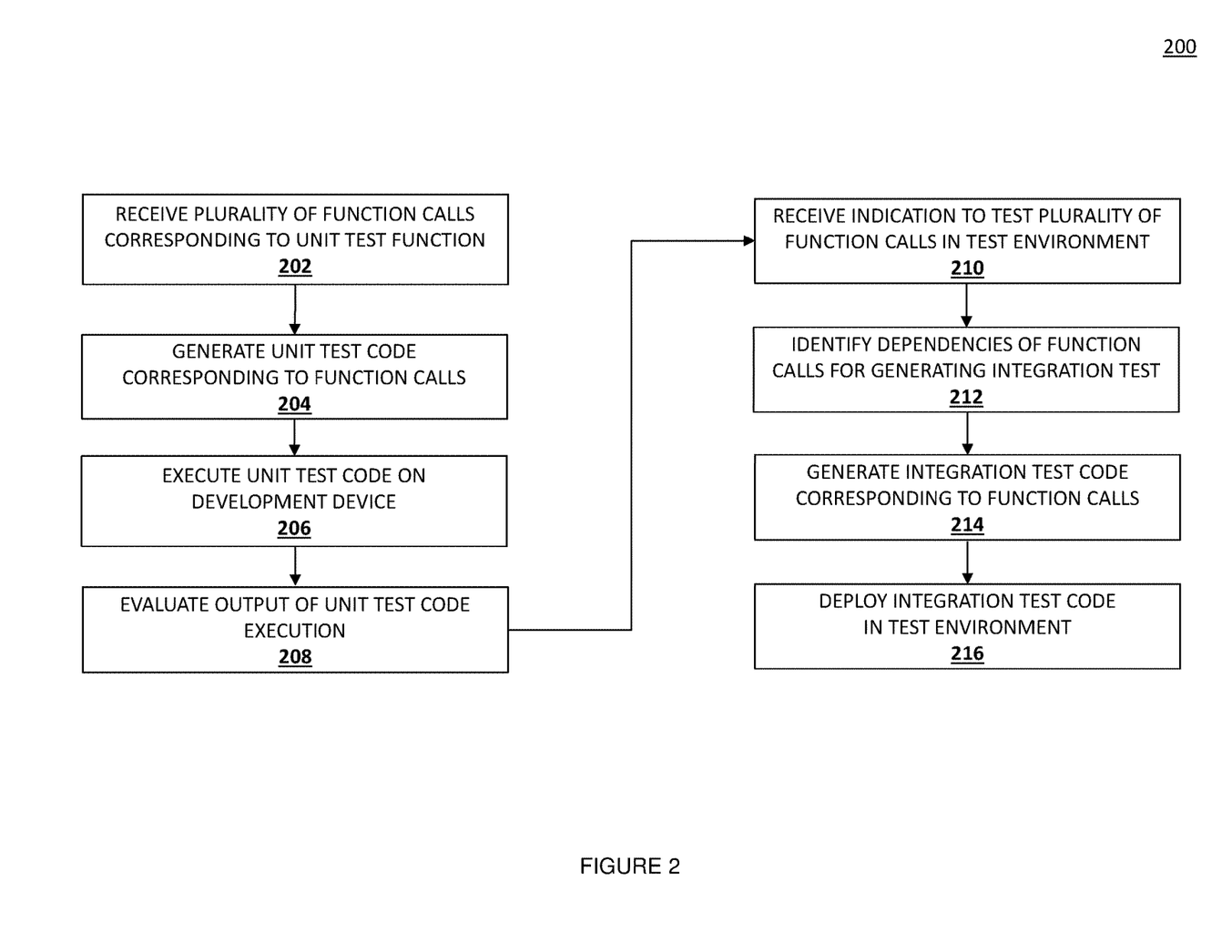
FIG. 2 is a flow chart illustrating an embodiment of a method for testing software programs.

Referring now to FIG. 2, an embodiment of a method 200 for generating unit test code and integration test code for testing software is illustrated. In the embodiments and examples discussed below, the software program is a web application that allows a user to manage his or her account with a payment provider. Individual constituent modules of that software program include various functions, such as logging in to the web application with a username and password. However, other examples of the software program are also possible, such as an application to be deployed on a mobile phone operating system, an application to be deployed on a traditional desktop/laptop computing device, and the like. Likewise, other examples of the constituent modules are also possible, such as a module that allows the user to transfer money from his or her account to a recipient, or a module that allows the user to add money to his or her account, and the like.

The method 200 begins at block 202 where a software testing framework receives a plurality of function calls. Each function call in the plurality corresponds to a unit test function for testing a software module. In one embodiment, the software testing framework is deployed on a computing device such as software testing framework server 130 illustrated in FIG. 1. In one embodiment, the function calls correspond to calls to an application programming interface, such as API 131 of software testing framework server 130. The unit test functions, in one example, may include calls to various application programming interfaces or libraries that the software module relies on. The unit test functions may be written by the developer or developers of the software module to test what the developers expect to happen before execution of the test, during execution of the test, and after execution of the test. In one embodiment, the function calls use naming conventions that are similar to the naming conventions of their corresponding unit test functions. The unit test written by the developers of the software module may also indicate what corresponds to a successful result of the unit test. For example, a successful test may be one that results in no execution errors or no execution warnings, or the criteria for success may be set differently by the developers. The criteria for success may also be received by the software testing framework at block 202.

Upon receipt of the plurality of function calls, method 200 proceeds to block 204, where the software testing framework deployed on software testing framework server 130 generates unit test code corresponding to the function calls. In one embodiment, the API 131 of the software testing framework server 130 generates the unit test code corresponding to the plurality of function calls. Thus, the API 131 or software testing framework server 130 may evaluate the function calls, and based on a database (e.g., database 132) of unit test code, may generate the corresponding unit test code.

Method 200 then proceeds to block 206. At block 206, the generated unit test code is executed or deployed on a development server implemented on one or more computing devices, such as development server 140 of FIG. 1. In one embodiment, the generated unit test code is transmitted over a network (e.g., network 120) to the development server 140. In one embodiment, the software testing framework may automatically cause the execution on the development server 140. In one embodiment, a developer utilizing client device 110 may cause the execution of the unit test code on the development server 140. In one embodiment, software may be developed using client device 110, and thus, the unit test code may be executed on client device 110 itself.

Execution of the unit test code on the development server 140 or client device 110 may result in an output, such as a log file, or an indication of a result from the execution of the code. The log file or other indication of the result may include details on whether any errors were encountered in the execution of the code, whether any warnings were triggered by the unit test (e.g., problems that the developer should take note of, but which would not necessarily prevent deployment of the code, or suggestions to the developer), a stack trace, and/or other data. In one embodiment, the log file or other data may be received by the software testing framework 130. In one embodiment, the log file or other data may be stored in log server 133 or database 132 for later use.

At block 208, the software testing framework may evaluate the log file or other data that resulted from the execution of the unit test code. The log file may be evaluated to determine whether the execution of the unit test was successful, based on the criteria identified by the developer, or based on default criteria (e.g., no errors).

Based upon a successful execution of the unit test code (as evaluated against the default or specified criteria), method 200 proceeds to block 210. At block 210, an indication to test the plurality of function calls in a test environment is received by the software testing framework. In one embodiment, the indication is received as part of a call to an application programming interface exposed by the software testing framework, such as application programming interface 131. In one embodiment, the indication includes an identifier for a test environment (e.g., an identifier for test environment 150 or test environment 160). The identifier may be, as one example, an IP address or set of IP addresses, or hostname(s) corresponding to the test environment. In one embodiment, the indication may be received from a user utilizing client device 110 or development server 140, based on an evaluation of the log file or other data that resulted from the execution of the unit test code. In one embodiment, the indication may be received based on an evaluation by the software testing framework server that no errors occurred during the execution of the unit test code. That is, in one embodiment, the software testing framework server may autonomously continue to perform integration testing.

Thus, method 200 proceeds to block 212, where the software testing framework identifies dependencies of the function calls received at block 202 for purposes of generating an integration test. For example, the software testing framework may evaluate dependencies to determine that a test database needs to be populated with data for an integration test of that software module. Likewise, the software testing framework may evaluate dependencies to determine that database query code is required for an update to the test database for an integration test of the login software module. Similarly, a representational state transfer (REST) request may be needed for an integration test of the login software module.

In one embodiment, the identified dependencies of the function calls received at block 202 may be based on the identifiers corresponding to the test environment, and particular characteristics of the test environment. Thus, the dependencies may be based on the devices included in the test environment. For example, the identified dependencies may include, or depend on, IP addresses or hostnames for the devices of the test environment (e.g., the server 152 of test environment 150), or particular software packages installed on the devices of the test environment.

At block 214 then, the software testing framework generates integration test code corresponding to the plurality of function calls. The integration test code includes dependency resolution code for the identified dependencies of the function calls. Thus, for example, the dependency resolution code may include the database query statements or REST requests to test the software component within the context of the larger software program. The dependency resolution code may likewise include code to establish a database connection that includes the identifier for the database (e.g., database 154). In one embodiment, the dependency resolution code may be generated and stored in an output file and associated with the unit test or the integration test code.

At block 216, the software testing framework may then deploy the integration test code in a test environment. In one embodiment, the test environment is one that emulates a production environment, so that the results of the integration test can be used to accurately predict the operation of the software when deployed for production use.

In one embodiment, after the integration test code is deployed in a test environment, a response returned from the deployment may be evaluated. If the deployment of the integration test code in the test environment was successful (e.g., deployment on test environment 150 without errors, or successful as defined by criteria set by the developers), the software may be tested on another test environment (e.g., test environment 160). For example, at an initial stage, an integration test may test a piece of software in a test environment with limited complexity, e.g., a limited number of servers and other components that emulate the test environment, such as test environment 150 having a single server 152 and single database server 154. The results of this limited test may be used to determine whether to perform an integration test on a more robust or more complex test environment, such as test environment 160 having multiple servers 162a-162d and databases 164a-164b. Since servers and hardware components can be expensive, performing the integration test initially on a less complex test environment reduces unnecessary utilization of the complex test environment.

Thus, a response from the deployment of the integration test code within a less-complex test environment (e.g., test environment 150) may be evaluated. Based on that evaluation, an indication to test the plurality of function calls in a second, more complex test environment (e.g., test environment 160) may be received by the software testing framework. For example, the indication may include a hostname or set of hostnames, or an IP address or other data, that corresponds to a more complex test environment. Based on the indication to test the plurality of function calls in the second test environment, integration test code corresponding to the function calls may be generated by the software testing framework. The integration test code may be similar to the integration test code described above with reference to method 200, but may include additional code that is particular to the second test environment. For example, the test environment 160 is depicted as having multiple database servers, and data may be split over those two servers. Thus, the second integration test code must be generated to take into account that data split. Likewise, the multiple servers in test environment 160 may be part of a load balancing arrangement that is tested as part of the integration test code. Once the integration test code is generated, it may then be deployed in the more complex test environment.

Thus, a system and method for generating unit tests and corresponding integration tests are disclosed that create both test variants without duplication of effort and can test software in a production environment in a more automated manner are disclosed. The systems and methods of the present disclosure provide substantial benefits over conventional solutions, such as the ability in a continuous deployment system for the integration tests to be generated and deployed based on the successful deployment of a unit test, without omitting tests of important aspects tested by the unit tests and duplication of effort.

Figure 3:
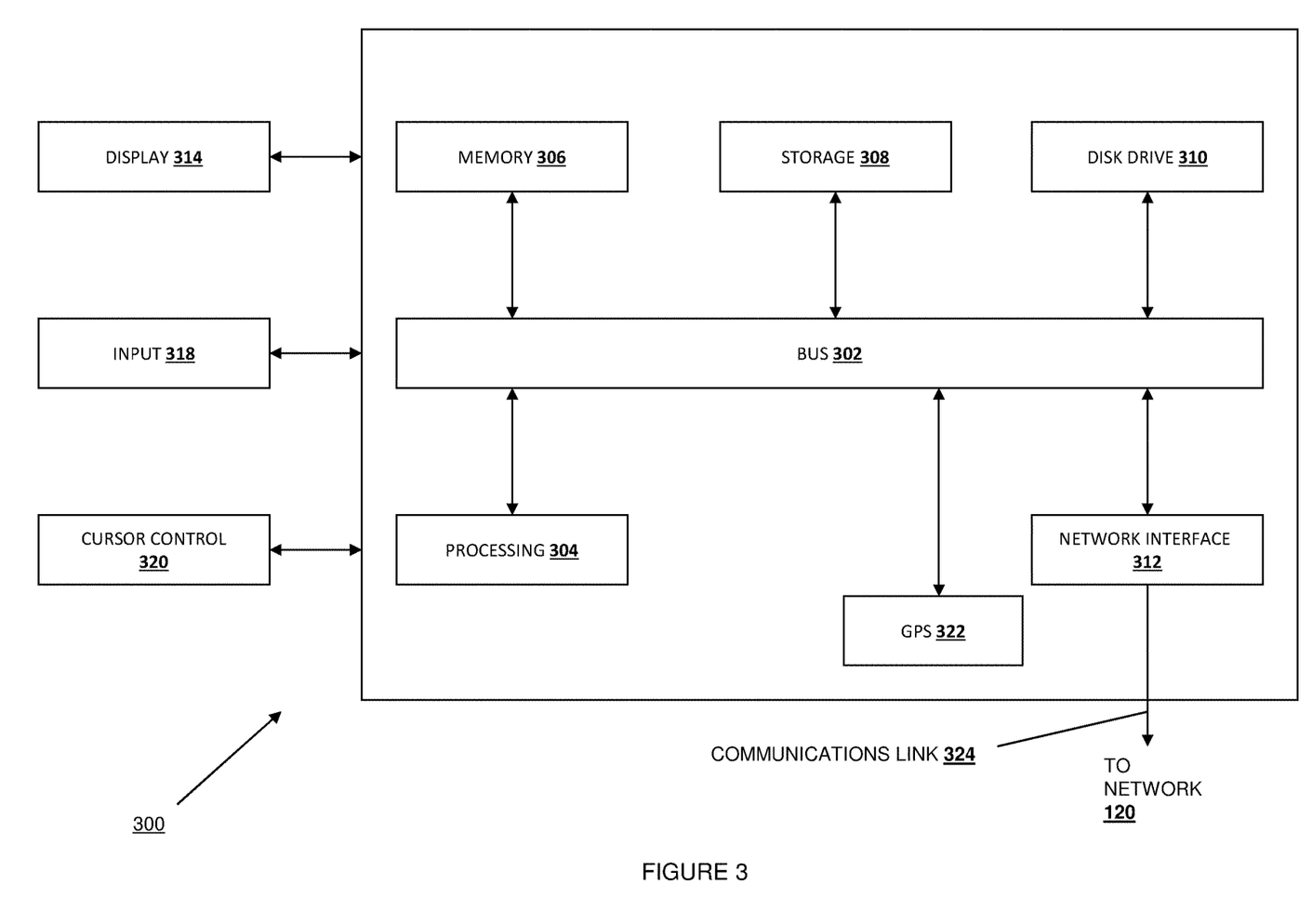

Referring now to FIG. 3, an embodiment of a computer system 300 suitable for implementing, for example, the client device 110, software testing framework server 130, database 132, log server 133, server 152, database 154, servers 162a-162d, and/or databases 164a-164b, is illustrated. It should be appreciated that other devices utilized in the system discussed above may be implemented as the computer system 300 in a manner as follows.

In accordance with various embodiments of the present disclosure, computer system 300, such as a computer and/or a network server, includes a bus 302 or other communication mechanism for communicating information, which interconnects subsystems and components, such as a processing component 304 (e.g., central processing unit, processor, micro-controller, digital signal processor (DSP), etc.), a system memory component 306 (e.g., RAM), a static storage component 308 (e.g., ROM), a disk drive component 310 (e.g., magnetic, optical, solid state, etc.), a network interface component 312 (e.g., modem or Ethernet card), a display component 314 (e.g., CRT or LCD), an input component 318 (e.g., keyboard, keypad, or virtual keyboard), a cursor control component 320 (e.g., mouse, pointer, or trackball), and/or a location determination component 322 (e.g., a Global Positioning System (GPS) device as illustrated, a cell tower triangulation device, and/or a variety of other location determination devices known in the art.) In one implementation, the disk drive component 310 may comprise a database having one or more disk drive components.

In accordance with embodiments of the present disclosure, the computer system 300 performs specific operations by the processor 304 executing one or more sequences of instructions contained in the memory component 306, such as described herein with respect to client device 110, software testing framework server 130, database 132, log server 133, server 152, database 154, servers 162a-162d, and/or databases 164a-164b. Such instructions may be read into the system memory component 306 from another computer readable medium, such as the static storage component 308 or the disk drive component 310. In other embodiments, hard-wired circuitry may be used in place of or in combination with software instructions to implement the present disclosure.

Logic may be encoded in a computer readable medium, which may refer to any medium that participates in providing instructions to the processor 304 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 310, volatile media includes dynamic memory, such as the system memory component 306, and transmission media includes coaxial cables, copper wire, and fiber optics, including wires that comprise the bus 302. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 300. In various other embodiments of the present disclosure, a plurality of the computer systems 300 coupled by a communication link 324 to the network 220 (e.g., such as a LAN, WLAN, PTSN, and/or various other wired or wireless networks, including telecommunications, mobile, and cellular phone networks) may perform instruction sequences to practice the present disclosure in coordination with one another.

The computer system 300 may transmit and receive messages, data, information and instructions, including one or more programs (i.e., application code) through the communication link 324 and the network interface component 312. The network interface component 312 may include an antenna, either separate or integrated, to enable transmission and reception via the communication link 324. Received program code may be executed by processor 304 as received and/or stored in disk drive component 310 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computer-implemented method, comprising:
    receiving, by a software testing framework, a plurality of function calls, each function call corresponding to a unit test function;
    generating, by the software testing framework and based on the plurality of function calls, unit test code;
    causing to be executed on a development device implemented on one or more computing devices the generated unit test code;
    based on determining a successful execution of the generated unit test code, receiving, by the software testing framework, an indication to test the plurality of function calls in a test environment;
    identifying, by the software testing framework, one or more dependencies of the plurality of function calls, wherein at least one dependency of the plurality of function calls is based on the test environment;
    generating, by the software testing framework, integration test code corresponding to the plurality of function calls, the integration test code comprising dependency resolution code for the identified one or more dependencies of the plurality of function calls, wherein the dependency resolution code includes a representation state transfer request transmitted to a server of the test environment; and
    deploying, by the software testing framework, the integration test code in the test environment.

2. The method of claim 1, wherein the test environment is a first test environment implemented on a first set of servers, wherein the one or more dependencies of the plurality of function calls is a first one or more dependencies, and wherein the integration test code is first integration test code, the method further comprising:

evaluating, by the software testing framework, a response returned from the deployment of the first integration test code within the first test environment;

receiving, by the software testing framework, an indication to test the plurality of function calls in a second test environment different than the first test environment, the second test environment implemented on a second set of servers, wherein a quantity of servers in the second set of servers is greater than a quantity of servers in the first set of servers;

identifying, by the software testing framework, a second one or more dependencies of the plurality of function calls, wherein at least one dependency in the second one or more dependencies is based on the second test environment;

generating, by the software testing framework, second integration test code corresponding to the function calls, the second integration test code including dependency resolution code corresponding to the second one or more dependencies of the plurality of function calls, the second integration test code different from the first integration test code; and deploying, in the second test environment, the second integration test code.

3. The method of claim 1, wherein the dependency resolution code corresponding to the one or more dependencies of the plurality of function calls further includes structured query language code for a database management server system of the test environment.

4. The method of claim 2, wherein the first set of servers includes a first quantity of database servers, wherein the second set of servers includes a second quantity of database servers, and wherein the second quantity of database servers is greater than the first quantity of database servers.

5. The method of claim 1, wherein the indication to test the plurality of function calls in a test environment is received as part of a call to an application programming interface exposed by the software testing framework.

6. The method of claim 1, further comprising determining, by the software testing framework, that the execution of the generated unit test code was successful based upon an evaluation of one or more log file entries.

7. A software testing system, comprising:
a development device implemented on a first one or more computing devices;
a test environment implemented on a second one or more computing devices; and
a software testing framework device, the software testing framework device comprising a non-transitory memory storing instructions and one or more hardware processors coupled to the non-transitory memory to cause the software testing framework device to perform operations comprising:
receiving a plurality of function calls, each function call corresponding to a unit test function;
generating, based on the plurality of function calls, unit test code;
causing to be executed, on the development device, the generated unit test code;
based on determining a successful execution of the generated unit test code, receiving an indication to test the plurality of function calls in the test environment;

identifying one or more dependencies of the plurality of function calls, wherein at least one dependency of the plurality of function calls is based on a characteristic of the test environment;

generating integration test code corresponding to the plurality of function calls, the integration test code comprising dependency resolution code for the identified one or more dependencies of the plurality of function calls, wherein the dependency resolution code includes a representation state transfer request transmitted to a computing device of the test environment; and deploying, in the test environment corresponding to the indication, the integration test code.

8. The system of claim 7, wherein the test environment is a first test environment, wherein the one or more dependencies of the plurality of function calls is a first one or more dependencies, wherein the integration test code is first integration test code, and wherein the operations further comprise:

evaluating a response returned from a deployment of the first integration test code within the first test environment;

receiving, an indication to test the plurality of function calls in a second test environment different than the first test environment, the second test environment implemented on a third one or more computing devices, wherein a quantity of devices in the third one or more computing devices is greater than a quantity of servers in the second one or more computing devices;

identifying a second one or more dependencies of the plurality of function calls, wherein at least one dependency in the second one or more dependencies is based on the second test environment;

generating second integration test code corresponding to the function calls, the second integration test code including dependency resolution code corresponding to the second one or more dependencies of the plurality of function calls, the second integration test code different from the first integration test code; and deploying, in the second test environment, the second integration test code.

9. The system of claim 7, wherein the dependency resolution code corresponding to the one or more dependencies of the plurality of function calls further includes structured query language code for a database management server system of the test environment.

10. The system of claim 8, wherein the second one or more computing devices includes a first quantity of database servers, wherein the third one or more computing devices includes a second quantity of database servers, and wherein the second quantity of database servers is greater than the first quantity of database servers.

11. The system of claim 7, wherein the indication to test the plurality of function calls in a test environment is received as part of a call to an application programming interface exposed by the software testing framework device.

12. The system of claim 7, wherein the operations further comprise determining that the execution of the generated unit test code was successful based upon an evaluation of one or more log file entries.

13. A non-transitory machine-readable medium having stored thereon machine-readable instructions executable to cause a machine to perform operations comprising:

receiving, by a software testing framework, a plurality of function calls, each function call corresponding to a unit test function;

generating, by the software testing framework and based on the plurality of function calls, unit test code;

causing to be executed, on a development device implemented on one or more computing devices, the generated unit test code;

based on determining a successful execution of the generated unit test code, receiving, by the software testing framework, an indication to test the plurality of function calls in a test environment;

identifying, by the software testing framework, one or more dependencies of the plurality of function calls, wherein at least one dependency of the plurality of function calls is based on the test environment;

generating, by the software testing framework, integration test code corresponding to the plurality of function calls, the integration test code comprising dependency resolution code for the identified one or more dependencies of the plurality of function calls; and deploying, by the software testing framework, the integration test code in the test environment, wherein the test environment is a first test environment implemented on a first set of servers, wherein the one or more dependencies of the plurality of function calls is a first one or more dependencies, wherein the integration test code is first integration test code, and wherein the operations further comprise:

evaluating, by the software testing framework, a response returned from the deployment of the first integration test code within the first test environment;

receiving, by the software testing framework, an indication to test the plurality of function calls in a second test environment different than the first test environment, the second test environment implemented on a second set of servers, wherein a quantity of servers in the second set of servers is greater than a quantity of servers in the first set of servers;

identifying, by the software testing framework, a second one or more dependencies of the plurality of function calls, wherein at least one dependency in the second one or more dependencies is based on the second test environment;

generating, by the software testing framework, second integration test code corresponding to the function calls, the second integration test code including dependency resolution code corresponding to the second one or more dependencies of the plurality of function calls, the second integration test code different from the first integration test code; and deploying, in the second test environment, the second integration test code.

14. The non-transitory machine-readable medium of claim 13, wherein the dependency resolution code corresponding to the one or more dependencies of the plurality of function calls includes structured query language code for a database management server system of the test environment.

15. The non-transitory machine-readable medium of claim 13, wherein the dependency resolution code corresponding to the one or more dependencies of the plurality of function calls includes a representation state transfer request transmitted to a server of the test environment.

16. The non-transitory machine-readable medium of claim 13, wherein the first set of servers includes a first quantity of database servers, wherein the second set of servers includes a second quantity of database servers, and wherein the second quantity of database servers is greater than the first quantity of database servers.

17. The non-transitory machine-readable medium of claim 13, wherein the indication to test the plurality of function calls in a test environment is received as part of a call to an application programming interface exposed by the software testing framework.

18. The method of claim 1, wherein an execution of the unit test code results in an output that contains one or more warnings triggered by the execution of the unit test code.

19. The system of claim 7, wherein an execution of the unit test code results in an output that contains one or more warnings triggered by the execution of the unit test code.

20. The non-transitory machine-readable medium of claim 13, wherein an execution of the unit test code results in an output that contains one or more warnings triggered by the execution of the unit test code.

* * * * *